US012638014B2

(12) United States Patent
Junod

(10) Patent No.: US 12,638,014 B2
(45) Date of Patent: May 26, 2026

(54) FLUID DELIVERY APPARATUS

(71) Applicant: FAS Medic S.A., Palézieux (CH)

(72) Inventor: Florent Junod, Anières (CH)

(73) Assignee: FAS MEDIC S.A, Palézieux (CH)

( * ) Notice: Subject to any disclaimer, the term of this patent is extended or adjusted under 35 U.S.C. 154(b) by 0 days.

(21) Appl. No.: 18/762,736

(22) Filed: Jul. 3, 2024

(65) Prior Publication Data

US 2025/0012266 A1     Jan. 9, 2025

(30) Foreign Application Priority Data

Jul. 7, 2023    (EP) ..................................... 23184201

(51) Int. Cl.
| | | |
|---|---|---|
| *F04B 43/12* | (2006.01) |
| *F04B 53/10* | (2006.01) |
| *F16K 3/08* | (2006.01) |
| *F16K 11/074* | (2006.01) |
| *F16K 31/04* | (2006.01) |

(52) U.S. Cl.
CPC ............ *F04B 43/12* (2013.01); *F04B 53/103* (2013.01); *F16K 3/08* (2013.01); *F16K 11/0743* (2013.01); *F16K 31/041* (2013.01); *F16K 31/043* (2013.01); *F16K 31/047* (2013.01); *Y10T 137/85978* (2015.04); *Y10T 137/86533* (2015.04); *Y10T 137/86863* (2015.04)

(58) Field of Classification Search
USPC .... 137/625.15, 625.46, 565.23, 565.36, 876, 137/870, 887; 251/161, 192, 314, 129.11
See application file for complete search history.

(56) References Cited

U.S. PATENT DOCUMENTS

| | | | | |
|---|---|---|---|---|
| 3,439,623 A | * | 4/1969 | Dietrich ................. | F04C 14/26 |
| | | | | 417/310 |
| 3,556,151 A | * | 1/1971 | Masuda .............. | F16K 11/0743 |
| | | | | 137/625.21 |
| 3,752,167 A | * | 8/1973 | Makabe .............. | F16K 11/0743 |
| | | | | 137/625.46 |
| 4,156,437 A | * | 5/1979 | Chivens .............. | F16K 11/0743 |
| | | | | 137/625.41 |
| 4,428,511 A | * | 1/1984 | Howell .............. | G01N 35/1097 |
| | | | | 137/625.11 |

(Continued)

OTHER PUBLICATIONS

Extended European Search Report prepared by the European Patent Office in application No. EP 23 18 4201 dated Dec. 21, 2023.

*Primary Examiner* — Matthew W Jellett
(74) *Attorney, Agent, or Firm* — McDonnell Boehnen Hulbert & Berghoff LLP

(57) ABSTRACT

A fluid delivery device is disclosed. The fluid delivery device comprises a first driven element, a second driven element and a drive shaft rotatable about a rotational axis. The first driven element can be driven by the drive shaft when it rotates in a first rotational direction and not driven by the drive shaft when it rotates in a second rotational direction opposite to the first rotational direction. The second driven element can be driven by the drive shaft when it rotates in the second rotational direction and not driven by the drive shaft when it rotates in the first rotational direction. The first and second driven elements each have one of: a pump for pumping fluid, and a fluid path selector for selectively directing fluid between a selector port and one or more of a plurality of communication ports of the fluid path selector.

14 Claims, 5 Drawing Sheets

(56) References Cited

U.S. PATENT DOCUMENTS

| | | | | | |
|---|---|---|---|---|---|
| 4,507,977 | A | * | 4/1985 | Cabrera | G01N 35/1097 |
| | | | | | 422/540 |
| 5,992,459 | A | * | 11/1999 | Sugita | F16K 31/041 |
| | | | | | 137/625.46 |
| 6,102,828 | A | * | 8/2000 | MacKenzie | E21B 34/16 |
| | | | | | 475/263 |
| 6,511,454 | B1 | * | 1/2003 | Nakao | A61M 1/72 |
| | | | | | 604/151 |
| 7,080,975 | B2 | * | 7/2006 | Besse | F04B 7/0007 |
| | | | | | 137/625.22 |
| 7,469,874 | B2 | * | 12/2008 | Akahori | F16K 7/065 |
| | | | | | 251/7 |
| 7,836,914 | B2 | * | 11/2010 | Drott | A61M 39/223 |
| | | | | | 251/297 |
| 11,353,121 | B2 | * | 6/2022 | Mackin | B64D 13/02 |
| 11,644,026 | B2 | | 5/2023 | Ehlert | |
| 11,913,684 | B2 | * | 2/2024 | Makihara | F16K 3/314 |
| 2005/0129584 | A1 | * | 6/2005 | Johnson | F16K 99/0028 |
| | | | | | 422/521 |
| 2009/0209863 | A1 | * | 8/2009 | Haveri | A61B 8/44 |
| | | | | | 165/104.19 |
| 2009/0285706 | A1 | | 11/2009 | Bunoz | |
| 2015/0129071 | A1 | * | 5/2015 | Farina | F16K 11/0743 |
| | | | | | 251/366 |
| 2020/0062573 | A1 | | 2/2020 | Suzuki et al. | |
| 2021/0231230 | A1 | * | 7/2021 | Finegan, Jr. | F16K 31/60 |
| 2022/0034020 | A1 | | 2/2022 | Kim et al. | |

* cited by examiner

FLUID DELIVERY APPARATUS

CROSS REFERENCE TO RELATED APPLICATIONS

The present application claims priority to European Patent Application No. 23184201.4 filed Jul. 7, 2023, the entire contents of which are herein incorporated by reference as if fully set forth in this description.

TECHNICAL FIELD

The invention relates to a fluid delivery apparatus. In particular the invention relates to a fluid delivery apparatus for pumping and/or fluid path selection.

BACKGROUND OF THE INVENTION

Fluid delivery devices are known for the purpose of selectively transferring fluid from a fluid source to an output. A fluid delivery device may comprise an inlet, a pump, and an outlet. In some applications, it is necessary to deliver fluids from multiple fluid sources to a common output. This has previously been achieved by using multiple pumps to draw fluid from separate fluid sources towards a common output.

There exists a need for an improved fluid delivery apparatus.

SUMMARY OF THE INVENTION

According to a first aspect of the invention, there is provided a fluid delivery device comprising any or all of the following features:

a first driven element;
a second driven element; and
a drive shaft;
the drive shaft being configured to be rotatably driven about a rotational axis;
the first driven element being configured to be driven by the drive shaft when the drive shaft rotates in a first rotational direction and not driven by the drive shaft when the drive shaft rotates in a second rotational direction opposite to the first rotational direction;
the second driven element configured to be driven by the drive shaft when the draft shaft rotates in the second rotational direction and not driven by the drive shaft when the drive shaft rotates in the first rotational direction;
wherein the first driven element and the second driven element each comprise one of:
a pump for pumping a fluid through the fluid delivery device; and
a fluid path selector for selectively directing fluid between a selector port and one or more of a plurality of communication ports of the fluid path selector.

By selectively directing fluid between a selector port and one or more of a plurality of communication ports, the fluid path selector can select between a number of different configurations, including: a configuration in which the selector port is in fluid communication with only a first communication port; a configuration in which the selector port is in fluid communication with only a second communication port; a configuration in which the selector port is in fluid communication with both the first communication port and the second communication port; and a configuration in which the selector port is not in fluid communication with any (e.g. is sealed from) of the plurality of communication ports.

This arrangement has the advantage of controlling two driven elements using a single drive input, while avoiding the need for complicated gear mechanisms. As such, the arrangement is suitable for fluid delivery devices on relatively small scales (e.g. fluid channels on the millimetre scale), where it is preferably to reduce the number of and simplify components for ease of manufacture.

The fluid delivery device may comprise a housing. The housing may support the first driven element. The housing may support the second driven element. The housing may support the drive shaft. The fluid delivery device may comprise a bearing. The bearing may be configured to support the drive shaft in the housing. The bearing may be located at a position along the rotational axis between the first driven element and the second driven element. This has the advantage of providing an efficiently packaged device wherein the reliability of rotation of the drive shaft is improved.

At least one of the first driven element and the second driven element may be driven by the drive shaft via a one-way drive transfer device. The one-way drive transfer device may be a sprag clutch. The one-way drive transfer device may be any other freewheeling device that permits drive transfer in one rotational direction.

The first driven element may comprise the pump. The pump may be a peristaltic pump. The peristaltic pump may comprise a peristaltic tube. The peristaltic tube may be disposed in a plane perpendicular to the rotational axis. This has the advantage of improving the efficiency of packaging of components of the device and reducing the height of the device in the direction of the rotational axis.

The second driven element may comprise the fluid path selector. The selector port may be provided in fixed relation to a housing portion of the fluid delivery device. At least one of the plurality of communication ports of the fluid path selector may be provided in fixed relation to the housing portion of the fluid delivery device. This provides the advantage of permitting convenient fluid connections with external fluid sources.

The plurality of communication ports may comprise a first communication port and a second communication port. The fluid path selector may comprise a moveable member. The moveable member may be configured to move relative to the plurality of communication ports. The moveable member may be configured to move between a first position configured to prevent fluid communication between the selector port and the second communication port, and a second position configured to prevent fluid communication between the selector port and the first communication port. The moveable member may have a third position configured to provide fluid communication between the selector port and both the first communication port and the second communication port. This has the advantage of providing a fluid delivery device which is capable of mixing fluids from multiple fluid sources.

The moveable member may comprise a selection surface. The selection surface may be configured to interface with the plurality of communication ports. The selection surface may comprise an axial recess. The axial recess may be configured to align with the selector port. The selection surface may comprise a radially-extending recess. The radially-extending recess may be configured to selectively align with at least one of the plurality of communication ports. This has the advantage of reducing the height of the fluid delivery device in the direction of the rotational axis and simplifies manufacture of the device. The radially-extending recess may comprise a first channel and a second channel. The first channel may be configured to align with the first communication port. The second channel may be configured to align with the second communication port.

The fluid delivery device may comprise a driving means, such as a motor. The driving means may be configured to drive the drive shaft. The first driven element may be disposed along the rotational axis between the driving means and the second driven element. The housing may contain and/or support the driving means, the first driven element and the second driven element. Incorporating the drive element into the device has the advantage of improving packaging efficiency.

The first driven element may comprise the pump and the second driven element may comprise the fluid path selector, and the fluid delivery device may comprise a connecting channel configured to fluidly connect the pump and the selector port of the fluid path selector, such that the pump is operable to pump fluid between the selector port and the selected one or more of the plurality of communication ports.

BRIEF DESCRIPTION OF THE DRAWINGS

Further features and advantages of the present invention will become apparent from the following description of embodiments thereof, presented by way of example only, and by reference to the drawings, in which.

DETAILED DESCRIPTION

In examples described herein, there is disclosed a fluid delivery device having multiple inlets, a selector for selecting an inlet, and a pump to drive fluid from the selected inlet to an outlet of the fluid delivery device. The selector is fluidly connected to the pump by a communication channel. The selector is a rotatable disc having multiple positions, such that the selector can switch at least between a first position in which a first inlet is fluidly connected with the pump, and a second position in which a second inlet is fluidly connected with the pump. In this way, the pump can draw fluids from one of a plurality of fluid sources based on the position of the selector. The selector can also mix fluids from more than one inlet, such that the pump can draw fluids from more than one of the plurality of fluid sources simultaneously. The selector can be rotated by a drive shaft driven by a motor. The selector is connected to the drive shaft by a sprag clutch such that the selector only rotates with the drive shaft in one direction of the drive shaft. The pump is connected to the same drive shaft by a sprag clutch such that the pump is driven only when the drive shaft rotates in one direction. The sprag clutches are arranged such that the pump and selector are driven by the drive shaft rotating in opposite directions. In this way, the drive shaft can be rotated in a first direction to actuate the selector to thereby choose a fluid source while the pump is inactive, and the drive shaft can be rotated in a second direction to drive the pump to thereby pump the selected fluid source (or fluid sources) to the outlet. Therefore, the fluid delivery drive is capable of pumping fluids from a selected one or more of a plurality of fluid sources using a single drive input operating in two rotational directions. In other arrangements, the fluid delivery device can include two selectors or two pumps, instead of having one selector and one pump.

Figure 1:
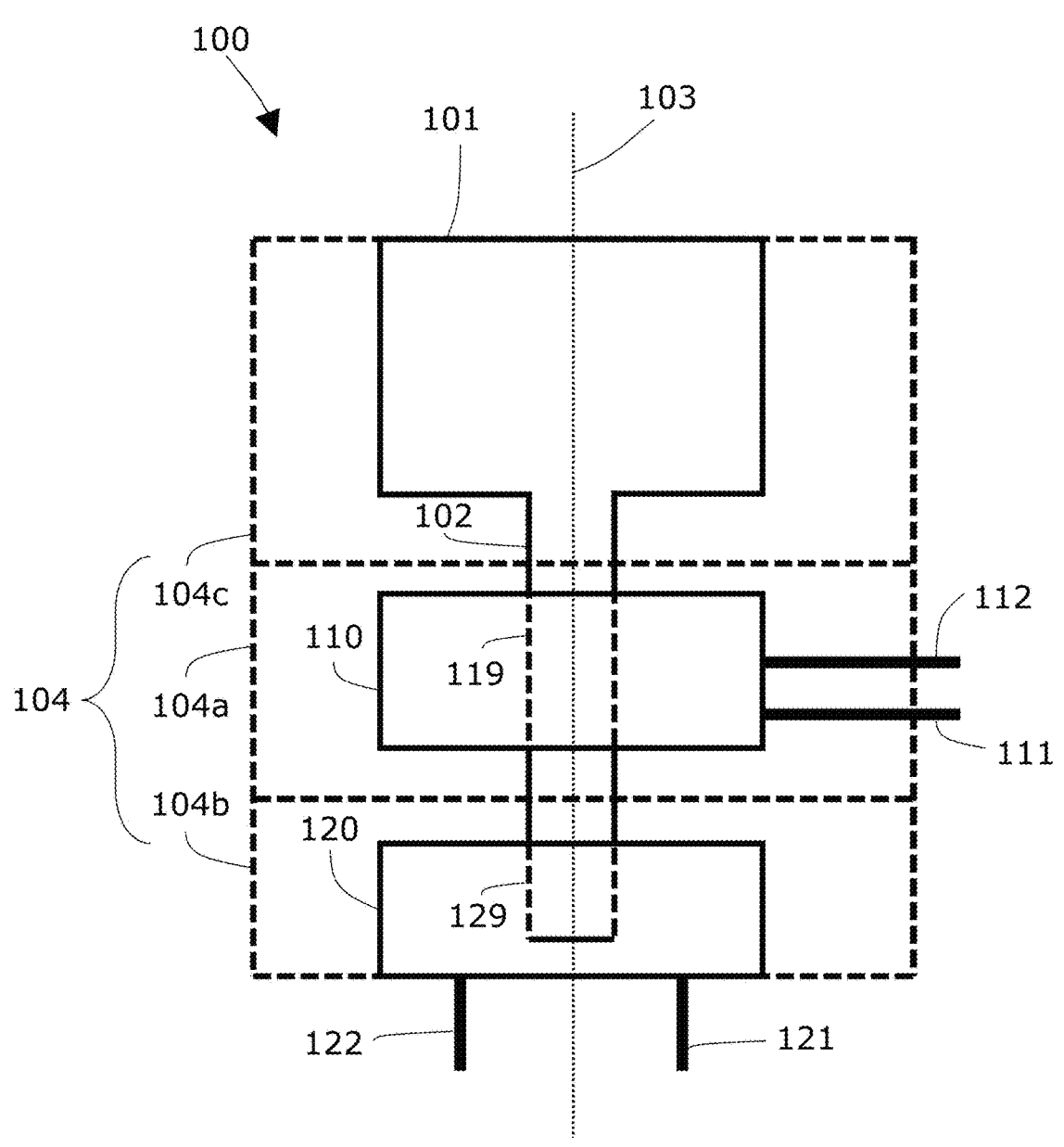
FIG. 1 is a schematic diagram of a fluid delivery device according to an embodiment.

FIG. 1 illustrates a fluid delivery device 100. The fluid delivery device 100 comprises a first driven element 110, a second driven element 120, and a drive shaft 102. The drive shaft 102 is configured to be rotatably driven about a rotational axis 103. The first driven element 110 is configured to be driven by the drive shaft 102 when the drive shaft 102 rotates in a first rotational direction. The first driven element 110 is further configured such that it is not driven by the drive shaft 102 when the drive shaft 102 rotates in a second rotational direction opposite to the first rotational direction. The second driven element 120 is configured to be driven by the drive shaft 102 when the drive shaft 102 rotates in the second rotational direction. The second driven element 120 is further configured such that it is not driven by the drive shaft 102 when the drive shaft 102 rotates in the first rotational direction. Therefore, the rotation of the drive shaft 102 in one direction drives only the first driven element 110, and rotation of the drive shaft 102 in the other direction drives only the second driven element 120. In other words, the fluid delivery device 100 is configured such that the first driven element 110 and the second driven element 120 cannot be driven simultaneously by the drive shaft 102.

The fluid delivery device 100 may comprise driving means 101 for driving the drive shaft 102. In one arrangement, the fluid delivery device comprises a motor 101 configured to drive the drive shaft 102. The motor 101 may be a stepper motor. The drive shaft 102 may extend from the driving means 101 from a central axis thereof. The fluid delivery device 100 may be arranged such that the first driven element 110 is disposed along the rotational axis 103 between the driving means 101 and the second driven element 120.

The fluid delivery device 100 may comprise a housing 104. The housing 104 may be configured to contain and/or support any or all of the driving means 101, the drive shaft 102, the first driven element 110 and the second driven element 120. The housing 104 may comprise a first housing portion 104a configured to house the first driven element 110, a second housing portion 104b configured to house the second driven element 120, and a third housing portion 104c configured to house the motor 101. The first housing portion 104a, the second housing portion 104b and the third housing portion 104c may be fixed together by at least one fastening component. In one arrangement, the fluid delivery device 100 comprises a fastening component configured to fix the housing portions 104a, 104b, 104c together such that the first housing portion 104a is disposed between the second housing portion 104b and the third housing portion 104c.

The fluid delivery device 100 may comprise a bearing (not shown) configured to support the drive shaft 102 relative to the housing 104. The bearing may be a roller bearing having an inner race fixed to the drive shaft 102 and an outer race fixed to the housing 104. In one arrangement, the bearing is provided at a position along the rotational axis 103 between the first driven element 110 and the second driven element 120. The bearing may be supported by the first housing portion 104*a*.

The first driven element 110 may be driven by the drive shaft 102 via a first one-way drive transfer device 119, which may be a sprag clutch or other freewheeling device arranged to deliver rotational drive only in one rotational direction. The first one-way drive transfer device 119 may be arranged between the drive shaft 102 and the first driven element 110 such that, when the drive shaft 102 rotates in the first rotational direction, the first one-way drive transfer device 119 transfers rotational drive from the drive shaft 102 to the first driven element 110, and when the drive shaft 102 rotates in the second rotational direction, the first one-way drive transfer device 119 freewheels such that rotational drive from the drive shaft 102 is not transferred to the first driven element 110. The second driven element 120 may be driven by the drive shaft 102 via a second one-way drive transfer device 129, which may be a sprag clutch or other freewheeling device arranged to deliver rotational drive only in one rotational direction. The second one-way drive transfer device 129 may be arranged between the drive shaft 102 and the second driven element 120 such that, when the drive shaft 102 rotates in the second rotational direction, the second one-way drive transfer device 129 transfers rotational drive from the drive shaft 102 to the second driven element 120, and when the drive shaft 102 rotates in the first rotational direction, the second one-way drive transfer device 129 freewheels such that rotational drive from the drive shaft 102 is not transferred to the second driven element 120. While it is appreciated that a freewheeling one-way drive transfer device may, due to the presence of friction, transfer some rotational drive to the corresponding driven element, the fluid delivery device 100 may be arranged such that the forces transferred during freewheeling are not sufficient to actuate the corresponding driven element.

Each of the first driven element 110 and the second driven element 120 comprises one of: a pump for pumping a fluid through the fluid delivery device 100, and a fluid path selector for selectively directing fluid between a selector port and one of a plurality of communication ports of the fluid path selector. As such, the fluid delivery device 100 may comprise: one pump and one fluid path selector; two pumps; or two fluid path selectors. In one arrangement, the first driven element 110 is a pump and the second driven element 120 is a fluid path selector. In an opposite arrangement, the first driven element 110 is a fluid path selector and the second driven element 120 is a pump. In another arrangement, the first driven element 110 and the second driven element 120 are both pumps. In yet another arrangement, the first driven element 110 and the second driven element 120 are both fluid path selectors.

In the arrangement in which the fluid delivery device 100 has two pumps, the first driven element 110 comprises a first port 111 and a second port 112 which represent an inlet and an outlet of the pump 110, respectively. Also, the second driven element 120 comprises a first port 121 and a second port 122 which represent an inlet and outlet of the pump 110, respectively. In this way, two pumps can be driven separately by driving the drive shaft 102 in opposite directions.

In the arrangement in which the fluid delivery device has two fluid path selectors, the first driven element 110 comprises a first port 111 and a second port 112, wherein the first port 111 represents a first selector port and the second port 112 represents a first plurality of communication ports such that the first driven element 110 can selectively direct fluid between the first selector port and one of the first plurality of communication ports. Also, the second driven element 120 comprises a first port 121 and a second port 122, wherein the first port 121 represents a second selector port and the second port 122 represents a second plurality of communication ports such that the second driven element 120 can selectively direct fluid between the second selector port and one of the second plurality of communication ports. In this way, two fluid path selectors can be driven separately by driving the drive shaft 102 in opposite directions.

In some arrangements, the first driven element 110 is fluidly connected to the second driven element 120. In the arrangement of the fluid delivery device 100 having two fluid path selectors, a channel (not shown) may be provided between the first port 111 of the first driven element 110 and the first port 121 of the second driven element 120. In this way, the first plurality of communication ports 112 can act as a set of selectable inputs while the second plurality of communication ports 122 can act as a set of selectable outputs.

Figure 2:
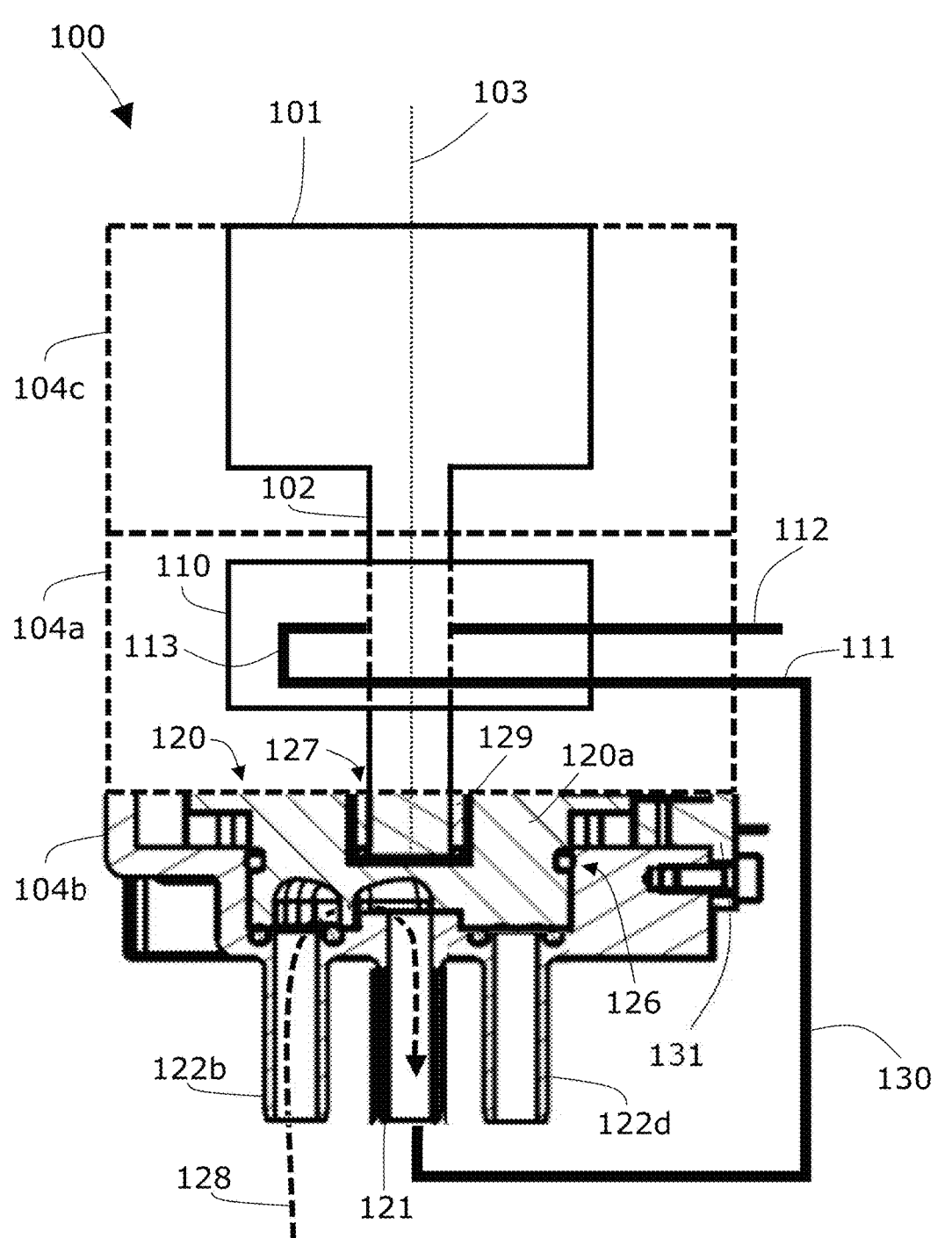
FIG. 2 is a further schematic diagram of the fluid delivery device of FIG. 1 including a sectional view of a fluid path selector.

FIG. 2 illustrates further detail of the fluid delivery device 100 having an arrangement including one pump and one selector. In the arrangement shown, the first driven element 110 is a pump configured to pump fluid through the fluid delivery device 100. The pump 110 may be any suitable pump that can be driven by a rotational input. The pump 110 may be a peristaltic pump as described in more detail with reference to FIG. 5. The pump 110 can be configured to pump fluid from the first port 111 of the pump 110 to the second port 112 of the pump, via a pump channel 113. In the arrangement shown, the second driven element 120 may be a fluid path selector. The fluid path selector 120 may comprise any suitable valve or selector capable of being driven by a rotational input to select between a plurality of fluid paths.

The fluid path selector 120 is configured to selectively direct fluid between a first port 121 of the fluid path selector 120 and one of a plurality of communication ports of the fluid path selector 120. For example, the fluid path selector 120 can select between a first configuration in which the first port 121 is in fluid communication with one communication port 122*b* (as shown by fluid path 128) and a second configuration in which the first port 121 is in fluid communication with another communication port 122*d*. As such, the fluid path selector 120 can select whether it delivers fluid from one or the other of two communication ports 122.

The fluid path selector 120 may be contained within the housing 104 and may be configured to move relative to the housing 104. In this respect, the fluid path selector 120 may comprise a moveable member 120*a* configured to move relative to the plurality of communication ports 122, so that the moveable member 120*a* can facilitate selecting between the plurality of communication ports 122. In the arrangement shown, the moveable member 120*a* comprises a bore 127 configured to receive an end of the drive shaft 102 and at least part of the second one-way drive transfer device 129. The bore 127 may be a blind bore extending from an axial face of the moveable member 120*a* and along the rotational axis 103.

The selector port 121 may be provided in fixed relation to the housing 104. The plurality of communication ports 122 may be provided in fixed relation to the housing 104. In the arrangement shown, the selector port 121 and the plurality of communication ports 122 are provided as integral parts of a second housing portion 104b. The selector port 121 and the plurality of communication ports may comprise tubular extensions of the housing 104, extending in a direction parallel to the rotational axis 103 of the drive shaft 102. The selector port 121 may have a longitudinal axis colinear with the rotational axis 103.

The fluid delivery device 100 may include sensing means configured to establish the rotational position of the first driven element 110 and/or the second driven element 120. The sensing means may comprise an optical sensor. In the arrangement shown, the fluid delivery device 100 comprises an optical sensor 131 configured to measure the rotational position of the fluid path selector 120.

The fluid delivery device 100 may be configured such that the pump 110 is fluidly connected with the fluid path selector 120. The pump 110 may be fluidly connected to the fluid path selector 120 via a connecting channel 130. The connecting channel 130 may be at least partially defined within the fluid delivery device 100 or may be external to the fluid delivery device 100. In the arrangement shown, the connecting channel 130 comprises a fluid path external to the housing 104 of the fluid delivery device 100. The selector port 121 of the fluid path selector 120 may be fluidly connected to the first port 111 of the pump 110. In this way, the pump 110 can be configured to pump fluid from the selected communication port or ports 122, via the selector port 121.

Figure 3A:
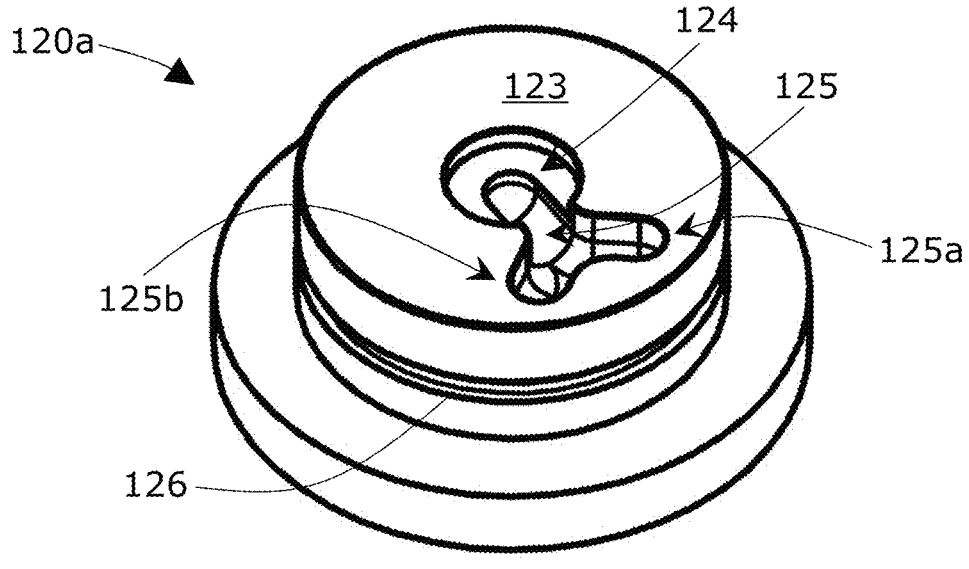
FIG. 3A is a perspective view of a moveable member of the fluid delivery device according to an embodiment.
Figure 3B:
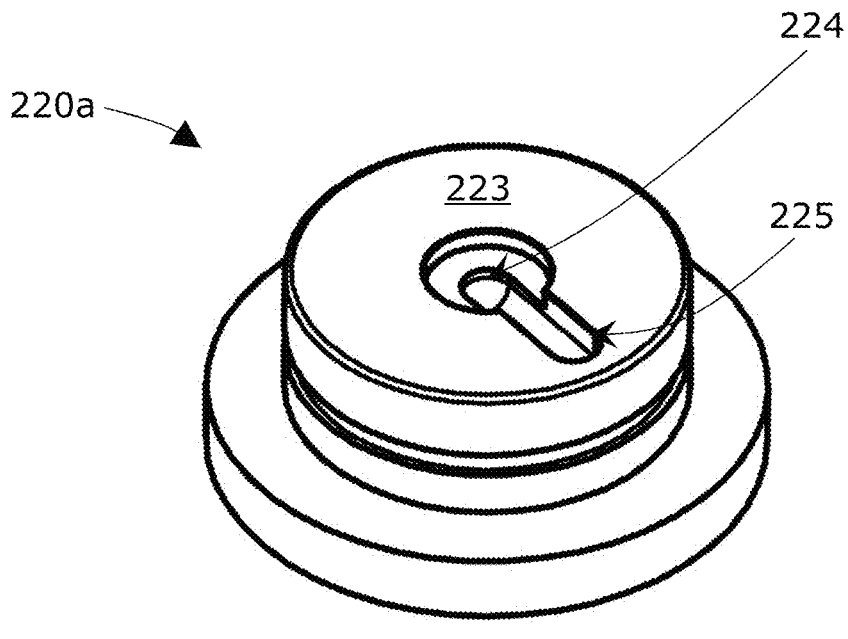
FIG. 3B is a perspective view of a moveable member of the fluid delivery device according to another embodiment.

FIGS. 3A and 3B illustrate two possible embodiments of a fluid path selector, in particular a moveable member of a fluid path selector. FIG. 3A illustrates a first moveable member 120a and FIG. 3B illustrates a second moveable member 220a. In each case, the moveable member 120a, 220a may be configured to rotate within the housing 104. As such, the moveable member 120a, 220a may have a substantially cylindrical outer surface. In the arrangements shown, each moveable member 120a, 220a comprises a body with a first portion having a first radius and second portion having a second, larger radius. The cylindrical axes of the first and second portions may be colinear such that the moveable member 120a, 220a has a T-shaped cross-section (see FIG. 2).

The moveable member 120a, 220a may comprise sealing means to contain the flow of fluid. The moveable member 120a, 22a may comprise a groove on an outer cylindrical surface thereof. In the arrangement shown in FIG. 3A, the first portion has a groove 126 disposed around the cylindrical surface and configured to receive an O-ring (see FIG. 2), to thereby seal the moveable member 120a against the housing 104, in particular against the second housing portion 104b.

The moveable member 120a, 220a can comprise means to transfer fluid between the selector port and at least one of the plurality of communication ports. Such means may be provided by a selection surface 123, 223 of the moveable member 120a, 220a configured to interface with the plurality of communication ports 122. The selection surface 123, 223 may comprise an axial face of the moveable member 120a, 220a. In the arrangement shown, the first portion (i.e., the cylindrical portion having a smaller radius) comprises a face, configured to be perpendicular to the rotational axis 103, which provides the selection surface 123, 223. The moveable member 120a, 220a may be configured such that it retains a fluid communication with the selector port 121 irrespective of the position of the moveable member 120a, 220a. For example, the moveable member 120a, 220a may comprise an axial recess 124, 224 configured to align with the rotational axis 103 of the drive shaft 102. As such, the moveable member 120a, 220a can be rotated while the axial recess 124, 224 retains its position relative to the housing 104.

As shown in FIG. 3A. the moveable member 120a according to the first embodiment may comprise a selection surface 123 configured to provide fluid communication between the selector port and up to two communication ports. The moveable member 120a may comprise two channels configured for alignment with up to two communication ports. In the arrangement shown, the selection surface 123 comprises a first channel 125a and a second channel 125b. The first channel 125a and the second channel 125b can be fluidly connected to the axial recess 124 via a radial recess 125. The first channel 125a and the second channel 125b may be provided at a radially outward position of the selection surface 123 relative to the axial recess 124. The first channel 125a and the second channel 125b may be provided as separate branches of the radial recess 125.

As shown in FIG. 3B, the moveable member 220a according to the second embodiment may comprise a selection surface 223 configured to provide fluid communication between the selector port and one communication port. The moveable member 220a may comprise a radial recess 225 configured for alignment with a communication port. In the arrangement shown, the radial recess 225 comprises an extension of the axial recess 224 in a radially outward direction.

Figure 4A:
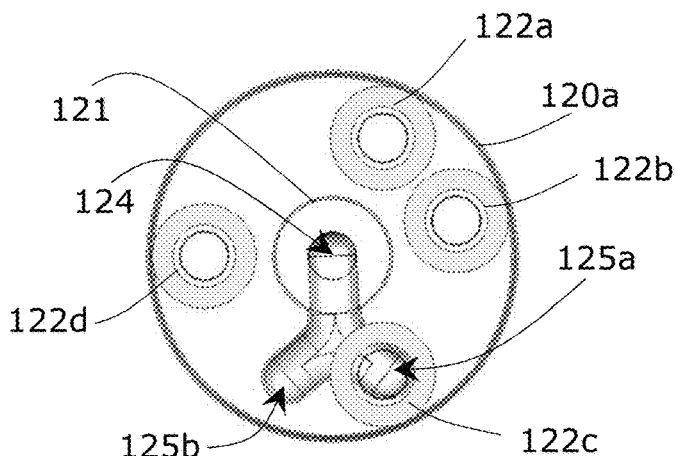
FIG. 4A is a schematic plan view of a fluid path selector of the fluid delivery device.
Figure 4B:
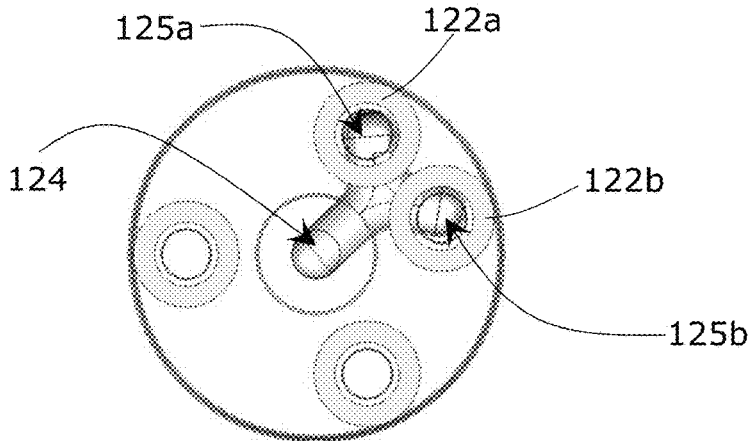
FIG. 4B is a schematic plan view of the fluid path selector of FIG. 4A in another position.
Figure 4C:
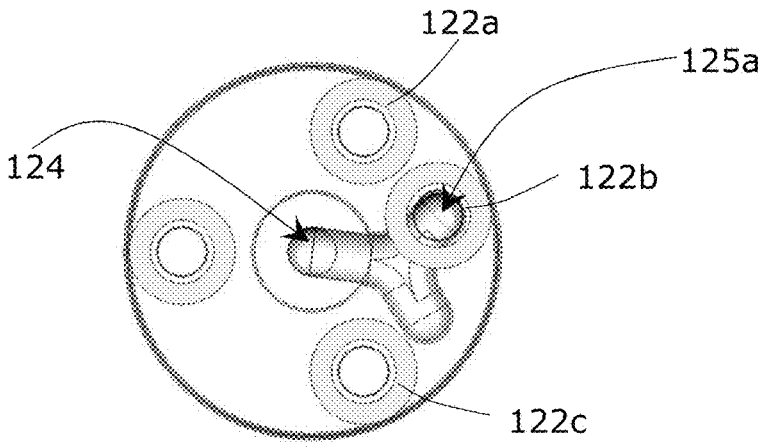
FIG. 4C is a schematic plan view of the fluid path selector of FIG. 4A in yet another position.

FIGS. 4A to 4C illustrate an arrangement of a fluid path selector 120 being configured for selectively directing fluid between a selector port 121 and at least one of a plurality of communication ports 122. In the arrangement shown, the moveable member 120a is rotatable relative to the plurality of communication ports 122. The moveable member 120a is configured to have different rotational positions in which one or both channels 125a, 125b are aligned with different communication ports 122. In the arrangement shown, the fluid delivery device 100 comprises a first communication port 122a, a second communication port 122b, a third communication port 122c and a fourth communication port 122d. The communication ports 122 are distributed in a circular array around the moveable member 120a. The second communication port 122b may be on an opposite side of the circular array to the fourth communication port 122d (see FIG. 2). The first communication port 122a may be provided adjacent the second communication port 122b. The angle between the first communication port 122a and the second communication port 122b with respect to the rotational axis 103 may be substantially the same as the angle between the first channel 125a and the second channel 125b of the moveable member 120a.

As shown in FIG. 4A, the fluid path selector 120 may have a position in which the selector port 121 is in fluid communication with a communication port, while fluid communication between the selector port 121 and the other communication ports is prevented. In the arrangement shown, the moveable member 120a provides fluid communication between the selector port 121 and the third communication port 122c by alignment with the first channel 125a of the selection surface 123. Fluid communication between the selector port 121 and the first communication port 122a, second communication port 122b and the fourth communication port 122d is prevented.

Further rotational positions of the moveable member 120a in which the selector port 121 is in fluid communication with only one communication port can be envisaged. For example, fluid communication with the third communication port 122c may also be achieved by aligning the third communication port 122c with the second channel 125b of the selection surface 123, instead of the first channel 125a. Also, fluid communication between the selector port 121 and the fourth communication port 122d could be achieved by rotating the moveable member 120a into a position in which the fourth communication port 122d is aligned with either the first channel 125a or the second channel 125b.

As shown in FIG. 4B, the fluid path selector 120 may have a position in which the selector port 121 is in fluid communication with two communication ports. In the arrangement shown, the moveable member 120a is in a rotational position such that the selector port 121 is in fluid communication with both the first communication port 122a and the second communication port 122b. This is facilitated by the alignment of the first channel 125a with the first communication port 122a, and the alignment of the second channel 125b with the second communication port 122b. As such, two communication ports 122a, 122b can provide a pair configured to align with the first channel 125a and the second channel 125b.

As shown in FIG. 4C, the moveable member 120a may have a position in which the selector port 121 is in fluid communication with the second communication port 122b, while fluid communication between the selector port 121 and the other communications ports 122a, 122c and 122d is prevented. Therefore, even though the first communication port 122a and the second communication port 122b can act as a pair, it can be seen from FIG. 4C that the moveable member 120a can be moved into a position in which only one of the pair is in fluid communication with the selector port 121. This can be facilitated by spacing the communication ports 122 from one another such that, when one channel (e.g. the first channel 125a) is aligned with a communication port (e.g. the second communication port 122b), the other channel (e.g. the second channel 125b) can be free from alignment with all communication ports 122 (e.g. aligned with a space between the second communication port 122b and the third communication port 122c).

Figure 5:
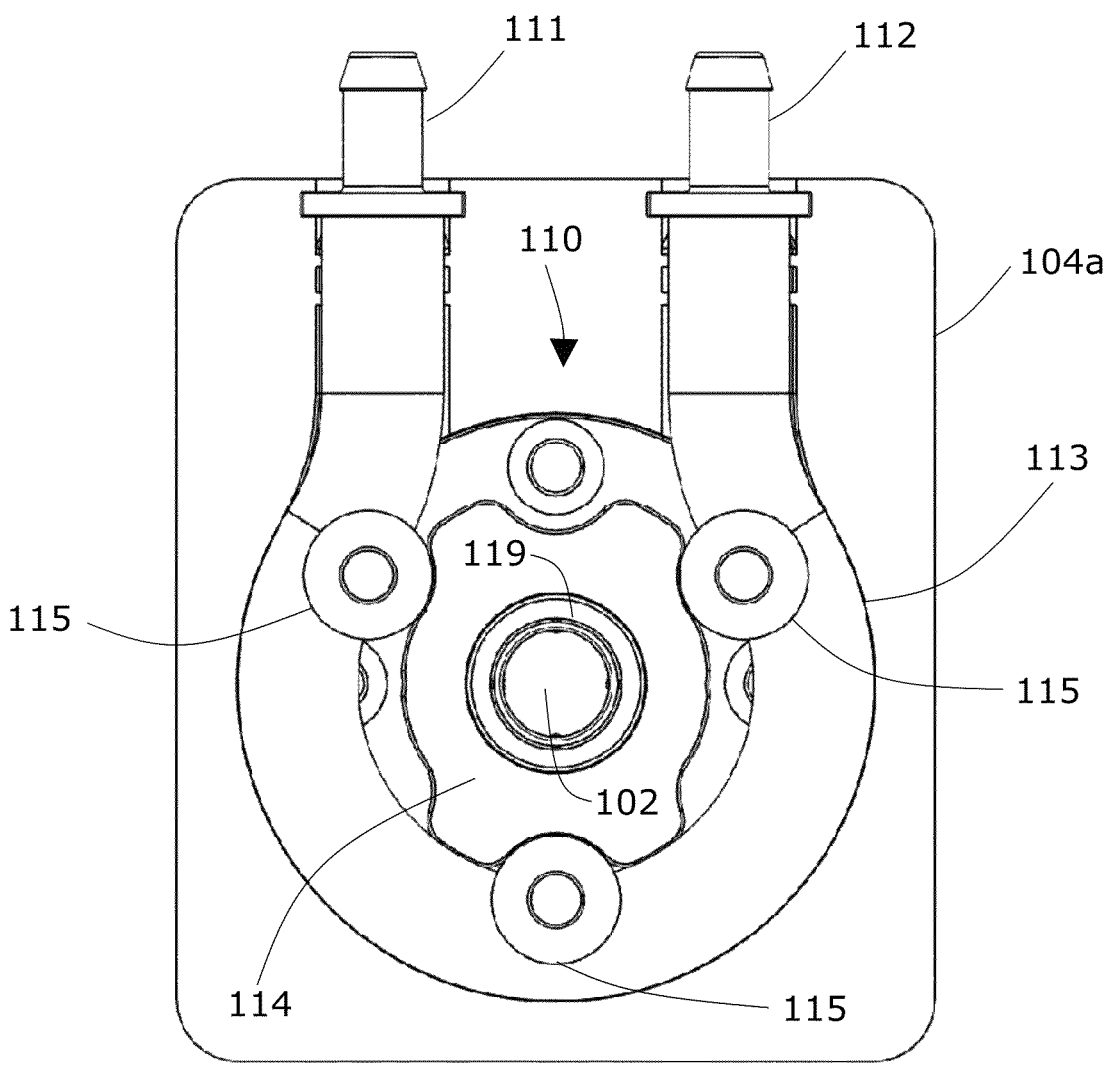
FIG. 5 is a plan view of a pump of the fluid delivery device.

FIG. 5 illustrates an arrangement of the pump 110. The pump 110 may be comprised in the first housing portion 104a of the fluid delivery device 100. The pump 110 may be a peristaltic pump wherein the pump channel 113 comprises a peristaltic tube 113. This pump 110 may further comprise a rotor 114 and at least one roller 115. The rotor 114 is disposed around the rotational axis 103 of the drive shaft 102 and is configured to rotate when the drive shaft 102 is driven in the first rotational direction. The at least one roller 115 is rotatably connected to the rotor 114. In the arrangement shown, the pump 110 comprises three rollers 115. The peristaltic tube 113 may comprise a flexible tube. The peristaltic tube 113 may be disposed in a plane perpendicular to the rotational axis 103. The peristaltic tube 113 may be disposed around at least 180 degrees, preferably at least 200 degrees, preferably at least 220 degrees, preferably at least 240 degrees of the angular extent of the rotor 114. In view of the above, the pump 110 can be configured such that rotation of the rotor 114 causes the rollers 115 to squeeze the peristaltic tube 113 and pump fluid in the peristaltic tube 113 between the first port 111 and the second port 112 of the pump 110.

In operation, the fluid delivery device 100 can be used to pump fluids from selectable fluid sources based on the position of the fluid path selector 120. In one example, the first communication port 122a is connected to a fluid source containing liquid A and the second communication port 122b is connected to a fluid source containing liquid B. The fluid delivery device can be operated to deliver a volume of liquid A, then a volume of liquid B, and then a volume of a mixture of the liquids A+B. Starting from a position of the fluid path selector 120 in which the selector port 121 is fluidly connected to the first communication port 122a (e.g. via the second channel 125b), the pump 110 can be driven by the drive shaft 102 being rotated in the first rotational direction to pump liquid A from the fluid source, through the first communication port 122a and the second channel 125b, towards the axial recess 124 and through the selector port 121, and then along the connecting channel 130 to the pump channel 113 via the first port 111, and then out through the second port 112. In order to select liquid B, the drive shaft 102 can be driven in the second rotational direction to actuate the fluid path selector 120 until the second communication port 122b is in fluid communication with the selector port 121 (via the first channel 125a—see FIG. 4C). Liquid B can then be pumped through the fluid delivery device 100 by driving the drive shaft 102 in the first rotational direction. Then, to select liquids A+B, the drive shaft 102 can be driven in the second rotational direction to actuate the fluid path selector 120 until the selector port 121 is in fluid communication with both the first communication port 122a and the second communication port 122b (via the first channel 125a and the second channel 125b—see FIG. 4B). Liquids A+B can then be pumped through the fluid delivery device 100 by driving the drive shaft 102 in the first rotational direction.

The fluid delivery device 100 can be manufactured efficiently by stacking components in a single direction. For example, with reference to FIG. 2, assembly can begin with the motor 101 in the third housing portion 104c, with the drive shaft 102 extending axially from the motor 101. Next, the first housing portion 104a and the components of the pump 110 can be stacked onto the drive shaft 102, including the first one-way drive transfer device 119, the rotor 114 and the peristaltic tube 113. Subsequently, the bearing which supports the drive shaft 102 can be disposed around the drive shaft 102 and connected to the first housing portion 104a. Then, the second one-way drive transfer device 129 and the moveable member 120a of the fluid path selector 120 can be assembled onto the drive shaft 102. Finally, the second housing portion 104b, in which the selector port 121 and the plurality of communication ports 122 are integrated, can be assembled with the moveable member 120a and fastened to the first housing portion 104a by at least one fastening component.

The fluid delivery device 100 may be configured to deliver fluid at flow rates in the range of 50 to 600 ml/min (millilitres per minute). The fluid delivery device 100 may be configured to deliver fluid at pressures up to approximately 200 kPa (2 bar). For example, the fluid delivery device 100 may be configured to deliver fluid at pressures of at least 50 kPa (0.5 bar), or at least 100 kPa (1 bar), or at least 150 kPa (1.5 bar). The fluid delivery device 100 may be suitable for use with liquids having a viscosity in the range of 1 to 60,000 mPa·s (1 to 60,000 cP). For example, the fluid delivery device 100 can be configured for use with liquids having a viscosity of at least 10 mPa·s, or at least 100 mPa·s, or at least 1,000 mPa·s, or at least 10,000 mPa·s, or at least 30,000 mPa·s, or at least 50,000 mPa·s.

The fluid delivery device 100 may have a height measured along the rotational axis 103 of less than 30 cm, preferably less than 20 cm, preferably less than 15 cm, and preferably less than 13 cm. The maximum width of the fluid delivery device 100, measured perpendicularly to the rotational axis 103, may be less than 16 cm, preferably less than 12 cm, preferably less than 10 cm, and preferably less than 8 cm.

Any of the ports in the fluid delivery device 100, such as the selector port 121 and any of the communication ports 122, may have a diameter less than 10 mm, preferably less than 8 mm, preferably less than 6 mm and preferably less than 5 mm.

Although the fluid delivery device 100 has been described as being configured for fluid to enter the device through a communication port 122 of the fluid path selector 120 and exit the device from the pump 110 via the second port 112, the fluid delivery device may also be operated in reverse. Reversing the direction of the pump 110 such that fluid is directed towards the fluid path selector 120 can be achieved by switching the connecting channel 130 from being connected to the first port 111 to being connected to the second port 112, such that the pump 110 is fluidly connected to the fluid path selector 120 via a connecting channel 130 between the second port 112 and the selector port 121. Therefore, instead of using the fluid path selector 120 to select a fluid source, it may be used to selectively direct fluid from the pump 110 and out of a selected one (or more) of the plurality of communication ports 122. For example, the first port 111 may be connected to a fluid source containing a liquid C. The pump 110 can be driven by rotating the drive shaft 102 in the first rotational direction to pump liquid C from the source attached to the first port 111 to the second port 112, towards the selector port 121 and out of the selected communication port or ports. As before, the fluid path selector 120 can be actuated by driving the drive shaft 102 in the second rotational direction until the desired communication port or ports are aligned with the first channel 125a and/or the second channel 125b of the selection surface 123.

Furthermore, while the fluid delivery device 100 has been described as selecting at most two communication ports simultaneously, the disclosure also extends to any number of communication ports, such as three or four or more. It will be appreciated that in order to cater for an increased number of simultaneous connections, the selection surface 123 may be modified to incorporate additional channels being fluidly connected to the axial recess 124. Also, while the moveable member 120a is disclosed as having four communication ports, there may only be two communication ports, or only three communication ports, or any number of communication ports greater than four.

Additionally, while the moveable member 120a has been described as selecting communication ports through a rotatable selection surface 123, the disclosure also encompasses arrangements in which the moveable member is configured to move linearly to select the communication ports. For example, rotation of the drive shaft 102 may drive a cam mechanism to actuate a cam follower in a linear direction, in order to move channels on a linear selection surface into and out of alignment with a plurality of communication ports.

While the pump 110 has been described as a peristaltic pump, the pump may take any suitable form that can be driven by a rotational input from the drive shaft 102, including a piston pump that can include a mechanism to transfer a rotational input to linear motion of the piston.

Various modifications, whether by way of addition, deletion and/or substitution, may be made to all of the above described embodiments to provide further embodiments, any and/or all of which are intended to be encompassed by the appended claims.

The invention claimed is:

1. A fluid delivery device comprising:
a first driven element;
a second driven element; and
a drive shaft, the drive shaft being configured to be rotatably driven about a rotational axis,
the first driven element being configured to be driven by the drive shaft when the drive shaft rotates in a first rotational direction and not driven by the drive shaft when the drive shaft rotates in a second rotational direction opposite to the first rotational direction,
the second driven element configured to be driven by the drive shaft when the drive shaft rotates in the second rotational direction and not driven by the drive shaft when the drive shaft rotates in the first rotational direction,
wherein the first driven element and the second driven element each comprise one of:
a pump for pumping a fluid through the fluid delivery device, and
a fluid path selector for selectively directing fluid between a selector port and one or more of a plurality of communication ports of the fluid path selector,
wherein the second driven element comprises the fluid path selector.

2. The fluid delivery device of claim 1, wherein the fluid delivery device comprises a housing that supports the first driven element, the second driven element and the drive shaft.

3. The fluid delivery device of claim 2, wherein the fluid delivery device comprises a bearing configured to support the drive shaft in the housing, the bearing being located at a position along the rotational axis between the first driven element and the second driven element.

4. The fluid delivery device of claim 1, wherein at least one of the first driven element and the second driven element is driven by the drive shaft via a one-way drive transfer device.

5. The fluid delivery device of claim 1, wherein the first driven element comprises the pump.

6. The fluid delivery device of claim 5, wherein the pump is a peristaltic pump comprising a peristaltic tube, the peristaltic tube being disposed in a plane perpendicular to the rotational axis.

7. The fluid delivery device of claim 1, wherein the selector port and the plurality of communication ports of the fluid path selector are provided in fixed relation to a housing portion of the fluid delivery device.

8. The fluid delivery device of claim 1, wherein the plurality of communication ports comprises a first communication port and a second communication port, and wherein the fluid path selector comprises a moveable member configured to move relative to the plurality of communication ports between a first position configured to prevent fluid communication between the selector port and the second communication port, and a second position configured to prevent fluid communication between the selector port and the first communication port.

9. The fluid delivery device of claim 8, wherein the moveable member has a third position configured to provide fluid communication between the selector port and both the first communication port and the second communication port.

10. The fluid delivery device of claim 8, wherein the moveable member comprises a selection surface configured to interface with the plurality of communication ports, wherein the selection surface comprises:
an axial recess configured to align with the selector port; and a radially-extending recess configured to selectively align with at least one of the plurality of communication ports.

11. The fluid delivery device of claim 10, wherein the radially-extending recess comprises a first channel and a second channel, wherein the first channel is configured to align with the first communication port and the second channel is configured to align with the second communication port.

12. The fluid delivery device according to claim 1, wherein the fluid delivery device comprises a motor configured to drive the drive shaft, and wherein the first driven element is disposed along the rotational axis between the motor and the second driven element.

13. The fluid delivery device of claim 1, wherein the first driven element comprises the pump and the second driven element comprises the fluid path selector, and wherein the fluid delivery device comprises a connecting channel configured to fluidly connect the pump and the selector port of the fluid path selector, such that the pump is operable to pump fluid between the selector port and the selected one or more of the plurality of communication ports.

14. The fluid delivery device of claim 13, wherein the connecting channel is, at least partially, external to the fluid delivery device.

* * * * *